US009285242B2

(12) United States Patent
Arya et al.

(10) Patent No.: US 9,285,242 B2
(45) Date of Patent: Mar. 15, 2016

(54) DETERMINING A CONNECTIVITY MODEL IN SMART GRIDS

(75) Inventors: Vijay Arya, Bangalore (IN); Shivkumar Kalyanaraman, Bangalore (IN); Devasenapathi Periagraharam Seetharamakrishnan, Bangalore (IN); Jayram S. Thathachar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 13/563,373

(22) Filed: Jul. 31, 2012

(65) Prior Publication Data
US 2014/0039818 A1  Feb. 6, 2014

(51) Int. Cl.
| G01R 21/00 | (2006.01) |
| G01D 4/00 | (2006.01) |
| H04L 12/751 | (2013.01) |
| H04L 12/26 | (2006.01) |

(52) U.S. Cl.
CPC ............... *G01D 4/00* (2013.01); *G01D 4/002* (2013.01); *H04L 43/0811* (2013.01); *H04L 45/02* (2013.01); *Y02B 90/246* (2013.01); *Y04S 20/42* (2013.01); *Y04S 20/48* (2013.01)

(58) Field of Classification Search
USPC ........................................................ 702/62
See application file for complete search history.

(56) References Cited

U.S. PATENT DOCUMENTS

| 8,121,741 | B2 | 2/2012 | Taft et al. |
| 2009/0281679 | A1* | 11/2009 | Taft et al. ..................... 700/297 |
| 2009/0309749 | A1 | 12/2009 | Gilbert et al. |
| 2010/0007219 | A1 | 1/2010 | de Buda et al. |
| 2012/0029720 | A1 | 2/2012 | Cherian et al. |
| 2012/0089384 | A1 | 4/2012 | Coyne et al. |
| 2012/0136638 | A1* | 5/2012 | Deschamps et al. ............. 703/2 |
| 2012/0324273 | A1* | 12/2012 | Shaffer et al. ................ 714/4.12 |
| 2013/0038467 | A1* | 2/2013 | Wang ....................... 340/870.02 |
| 2013/0091258 | A1* | 4/2013 | Shaffer et al. ................ 709/221 |

OTHER PUBLICATIONS

Shepard, Erik, "The Evolution of Geospatial Technology: From Enabling Technology to Critical Foundation for the Smart Grid." Apr. 13, 2012, 5 pages, available online at http://www.gslb.elp.com/index/display/elp-article-tool-template/_printArt as of Apr. 13, 2012.
GRIDiant Corporation, "GRIDmaster Advanced Grid Management," Technical Bulletin, 2010, 38 pages, Silicon Valley, Los Altos, California, USA.
U.S. Department of Energy, Office of Electricity Delivery & Energy Reliability, "Smart Grid Research & Development, Multi-Year Program Plan (MYPP)", 2010-2014, Second Draft: Mar. 2010, 83 pages, Washington, D.C., USA.

* cited by examiner

*Primary Examiner* — Paul D Lee
(74) *Attorney, Agent, or Firm* — Ference & Associates LLC (57) ABSTRACT

Methods and arrangements for determining a network connectivity model. Meters are interfaced with, and periodic synchronous power-related measurements are collected from different meters. Measurement messages are sent to a predetermined location for being consolidated and processed, and a network connectivity model is thereupon determined.

16 Claims, 11 Drawing Sheets

| Time Interval | Meter Measurements (Watt-hours) | | | | |
|---|---|---|---|---|---|
| | M1 | M2 | M3 | M4 | M5 |
| (0,10] | 8 | 3.5 | 1 | 2.5 | 4.5 |
| (10, 20] | 20.5 | 13.5 | 5 | 8.5 | 7 |
| (20, 30] | 18.5 | 14.5 | 9 | 5.5 | 4 |
| ... | ... | ... | ... | ... | ... |

FIG. 3a

Let $n$ be the total number of meters/nodes, indexed by $i, j$
Let $m$ be the total number of power-flow measurements, indexed by $k$.

For each meter node $i$, define $n$ binary variables $x_{ij}$ $x_{ij} = 1$ if $j$ is a descendant of $i$, 0 otherwise.

For a power-flow measurement at time step $k$, we consider the following conservation constraint:

Let $L_{ki}$ be the load measured by meter $i$ during the $k$th time step.

$$\bigwedge_{\text{nodes } i,} \sum_{j=1}^{n} x_{ij} L_{kj} = L_{ki} \quad (1)$$

The LHS of the equation includes the term $x_{ii} L_{ki}$
Therefore one trivial solution to the above equation is simply that $x_{ii} = 1$ and $x_{ij} = 0 \quad \forall j \neq i$
Different solutions are possible for each internal node - considering either children, or descendants further down to leaf nodes.

FIG. 4

Recover the full tree by finding connectivity corresponding to each node/meter.

Mathematical Programs to find the connectivity for node $i$:

ILP1 / LP1 : Sparsity / $L_1$ minimization
Recovers the child nodes of node $i$ $$\min \sum_{j \neq i} x_{ij}$$

$$\sum_{j \neq i} x_{ij} L_{kj} = L_{ki}, \quad \forall \text{ measurements } k$$

ILP: Binary constraints $\quad x_{ij} \in \{0, 1\}$
LP: Relaxation $\quad 0 \leq x_{ij} \leq 1$

ILP2 / LP2 : $L_1$ maximization
Recovers all leaves under node $i$ $$\max \sum_{j \neq i} x_{ij}$$

$$\sum_{j \neq i} x_{ij} L_{kj} = L_{ki}, \quad \forall \text{ measurements } k$$

ILP: Binary constraints $\quad x_{ij} \in \{0, 1\}$
LP: Relaxation $\quad 0 \leq x_{ij} \leq 1$

ILP3/LP3 : Zero objective
Recovers the child nodes of node $i$ $$\sum_{j \neq i} x_{ij} = c$$

$$\sum_{j \neq i} x_{ij} L_{kj} = L_{ki}, \quad \forall \text{ measurements } k$$

ILP: Binary constraints $\quad x_{ij} \in \{0, 1\}$
LP: Relaxation $\quad 0 \leq x_{ij} \leq 1$ For leaf nodes, there is no solution.
For all internal nodes including source/root, there will be a unique solution (if no relay nodes exist).
Relay nodes: For nodes which have same solution are relay nodes, merge them into a single node.

FIG. 5

Recover the full tree by finding the bases of the null space of load matrix H:

Define the matrix $H_{m \times n} = [L_{kj}]$
m = no. of measurements
n = no. of leaf meters.

The null space of H contains the information about the connectivity of nodes.

$m = n$

No. of measurements
= No. of leaf meters
= Rank

Leaf nodes
Independent columns
Rank

Given the basis vectors, we can recover the tree, starting from the node with the smallest number of leaf nodes under it.

Two bases of null space of H:

$$b1 \quad \begin{pmatrix} 0 & -1 \\ -1 & 1 \\ 1 & 0 \\ 0 & 1 \\ 1 & 1 \end{pmatrix} \quad \begin{pmatrix} 0 & 1 \\ 1 & 0 \\ -1 & -1 \\ -1 & -1 \\ 0 & -1 \end{pmatrix} \quad b2$$

Errors may arise due to:
- Synchronization errors,
- Line losses,
- Unmetered loads – street lights, few un-instrumented homes.

Recover the full tree by finding connectivity corresponding to each node/meter.

Mathematical Programs to find the connectivity for node $i$:

Sparsity + L2/L1: $\min \sum_{j \neq i} x_{ij} + \lambda \|Hx - L_i\|_\tau$ $\tau \in \{1, 2\}$ Binary constraints $x_{ij} \in \{0, 1\}$ Relaxation plus rounding $0 \leq x_{ij} \leq 1$ As long as error does not grow with measurements, true underlying connectivity can be found.

For leaf nodes, an error threshold is used to determine if there is no solution.

Tree constraints – each node has only one parent can also be used to resolve ambiguity in connectivity.

DETERMINING A CONNECTIVITY MODEL IN SMART GRIDS

BACKGROUND

Generally, the accuracy of connectivity information in a distribution grid deteriorates over time after repairs, maintenance, and rebalancing efforts. Energy distributors are continually seeking automated solutions to infer the connectivity model of their distribution grids—the underlying topology between different entities such as customers, transformers, and feeders. As part of smart grid transformations, distributors are deploying different types of meters—feeder, transformer, and consumer meters. One of the expectations from this deployment is that no more field inspections would be needed to determine the connectivity model between metered entities in the future after any maintenance, such that the connectivity model would be inferred automatically. However, conventional solutions to this and related questions have proven to be inadequate.

BRIEF SUMMARY

In summary, one aspect of the invention provides a method comprising obtaining, from meters in an electric power grid, power-related measurements; said obtaining comprising receiving the power-related measurements at at least one remote device; and consolidating and processing the power-related measurements to determine a network connectivity model.

Another aspect of the invention provides an apparatus comprising: at least one processor; and a computer readable storage medium having computer readable program code embodied therewith and executable by the at least one processor, the computer readable program code comprising: computer readable program code configured to obtain, from meters in an electric power grid, power-related measurements; computer readable program code configured to receive the power-related measurements at at least one remote device; and computer readable program code configured to consolidate and process the power-related measurements to determine a network connectivity model.

Yet another aspect of the invention provides a computer program product comprising: a computer readable storage medium having computer readable program code embodied therewith, the computer readable program code comprising: computer readable program code configured to obtain, from meters in an electric power grid, power-related measurements; computer readable program code configured to receive the power-related measurements at at least one remote device; and computer readable program code configured to consolidate and process the power-related measurements to determine a network connectivity model.

An additional aspect of the invention provides a method comprising: receiving measurements from smart meters in a power network; receiving measurements from at least one meter upstream from at least one smart meter in the power network; consolidating measurement data from the smart meters and the at least one upstream meter; and mapping connections between the smart meters and the at least one upstream meter based on the consolidated measurement data.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an example embodiment, most if not all of the process steps, components and outputs discussed with respect to FIGS. 1-8 can be performed or utilized by way of a processing unit or units and system memory such as those indicated, respectively, at 16' and 28' in FIG. 10, whether on a server computer, a client computer, a node computer in a distributed network, or any combination thereof.

Figure 1:
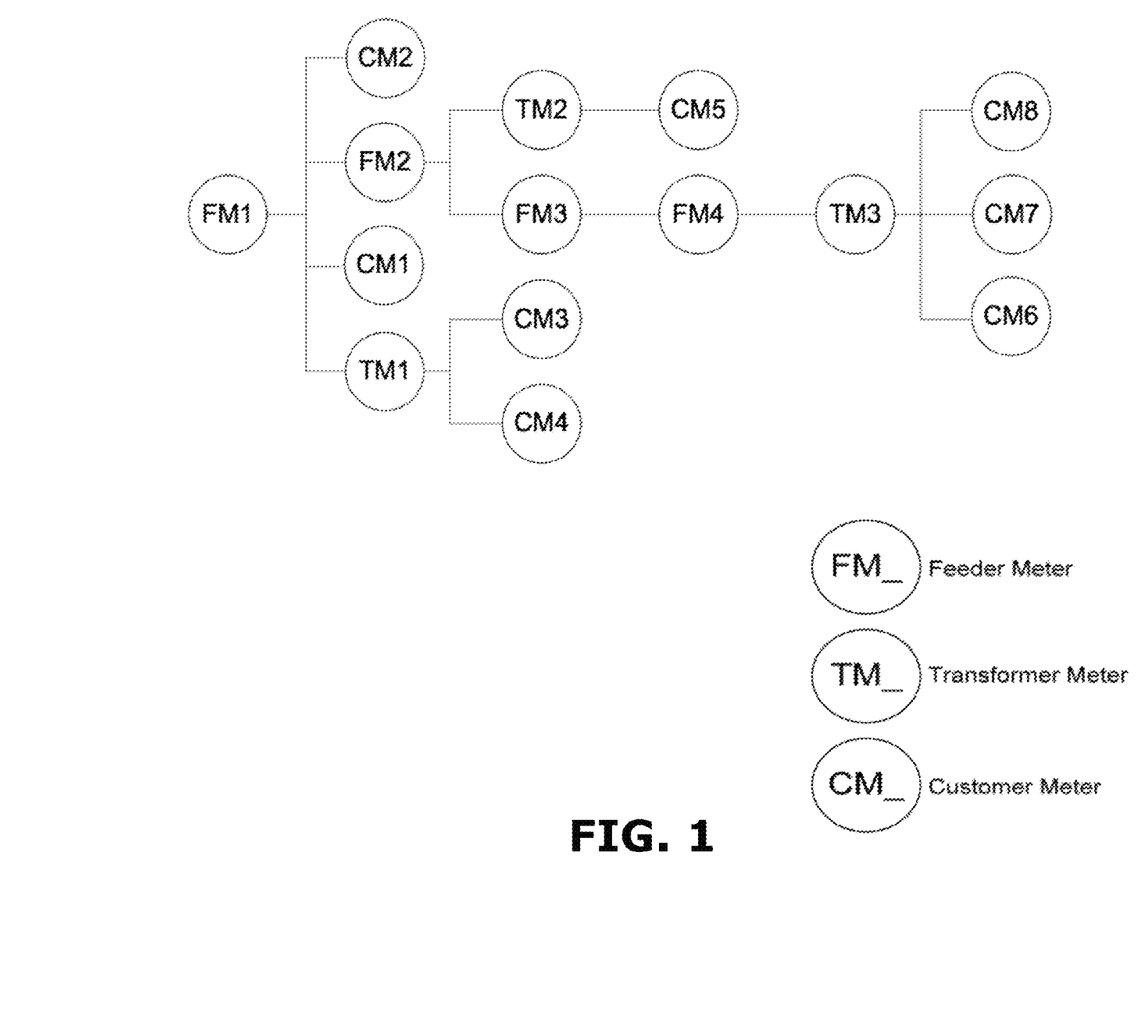
FIG. 1 schematically illustrates a sample problem.

In accordance with at least one embodiment of the invention, an analytics approach is employed to infer the underlying network connectivity model between metered assets using only meter data in radial distribution networks. As such, FIG. 1 schematically illustrates a sample problem that can be approached. Here, it may be desired to detect that meters CM1, FM2, CM2, TM1 are connected immediately downstream of FM1; detect that CM3 and CM4 are connected immediately downstream of TM1; detect that TM2 and FM3 are connected immediately downstream of FM2; detect that CM5 is connected immediately downstream of TM2; detect that FM4 is connected immediately downstream of FM3; detect that TM3 is connected immediately downstream of FM4; and detect that CM6, CM7, and CM8 are connected immediately downstream of TM3.

Conventionally, there have been employed signal injection techniques to approach problems such as that shown in FIG. 1. This requires communication over power lines and, given the capital needed for installation and maintenance, can prove to be very expensive. Installation affects grid operations, leading to more inconvenience and expense, while even more expense can derive from amplifiers and/or other assets for helping a signal travel long distances. Generally, this conventional solution requires an ability to inject a signal on each link, which can be enormously expensive. Particularly, in order to detect full tree connectivity, the signal would need to be injected successively top-down (tree-traversal), each time checking as to which meters respond to the injected signal. This requires a considerable amount of investment in signal injection assets. Also expensive are meters with receivers that can read out an injected signal. If power line communication is enabled all throughout the network, meters may report their measurements or other signals bottom-up and parent meters may successively detect child meters and the connectivity model may be inferred at the source. However, not all distributors employ power-line communication to collect meter measurements which may be capital-intensive to deploy.

Figure 2:
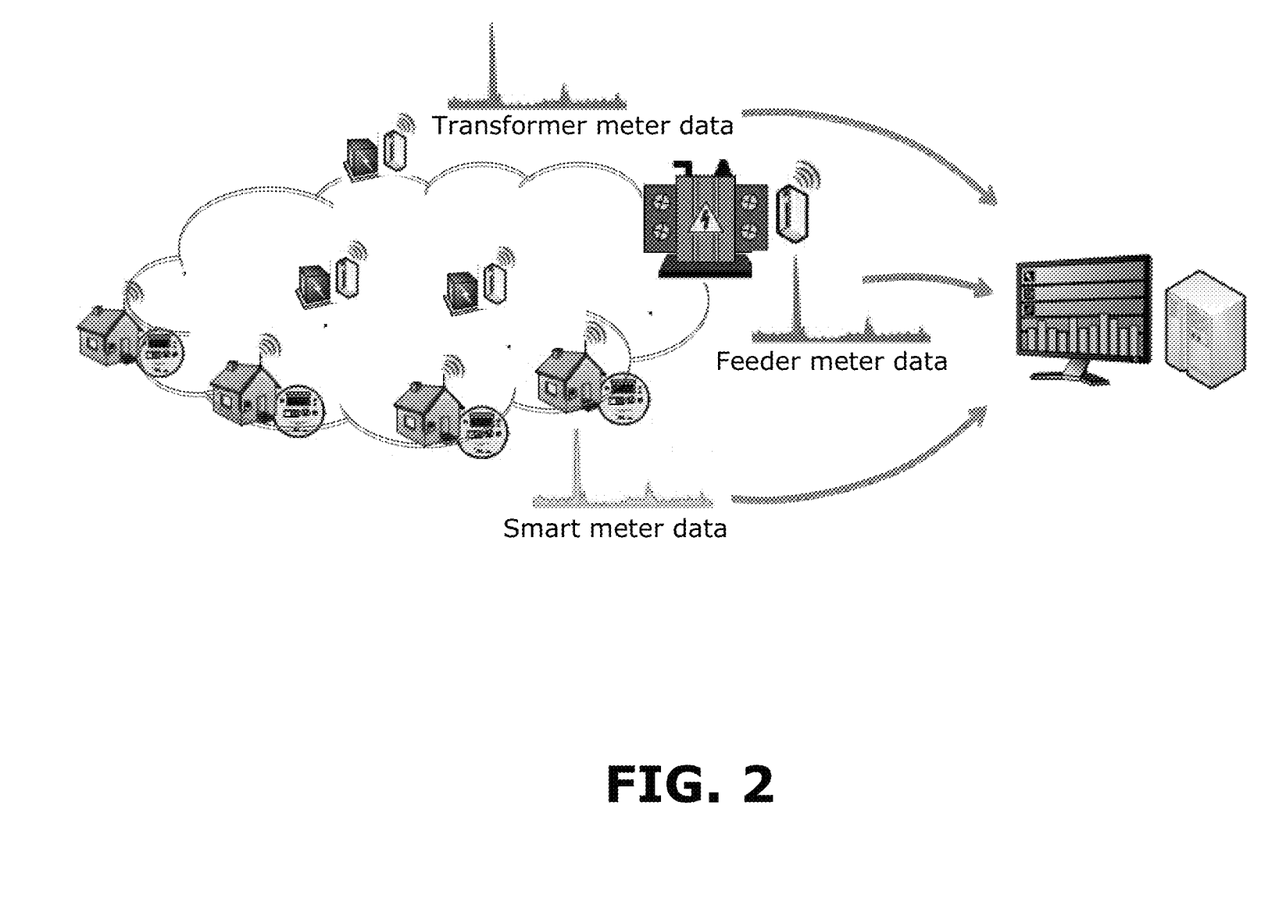
FIG. 2 schematically illustrates an overview of an arrangement employing an analytics approach.

A general overview of a solution in accordance with at least one embodiment of the invention is shown in FIG. 2. A connectivity model is determined using a time series of synchronized power-flow measurements collected from feeder, transformer, and smart meters. The measurement time series are processed at a central server using mathematical algorithms to recover the underlying connectivity. Generally, methods are broadly contemplated herein that exploit the principle of conservation of energy. The methods handle different types of errors in limited amounts, e.g., synchronization errors, line losses, and unmetered loads (e.g., street lights and other publicly owned structures, missing measurements from some homes).

Generally, it can be appreciated that a solution in accordance with at least one embodiment of the invention requires minimal investment and is less expensive compared to signal injection techniques. Such a solution also has no impact on the grid operations, as the data that are already generated are simply used to infer the connectivity. Further, it can be combined with signal injection techniques to reduce cost, e.g., meters in one geographical area or group can be detected using signal injection and interconnectivity within the group can be inferred using an analytics approach (as broadly contemplated herein).

Figure 3:
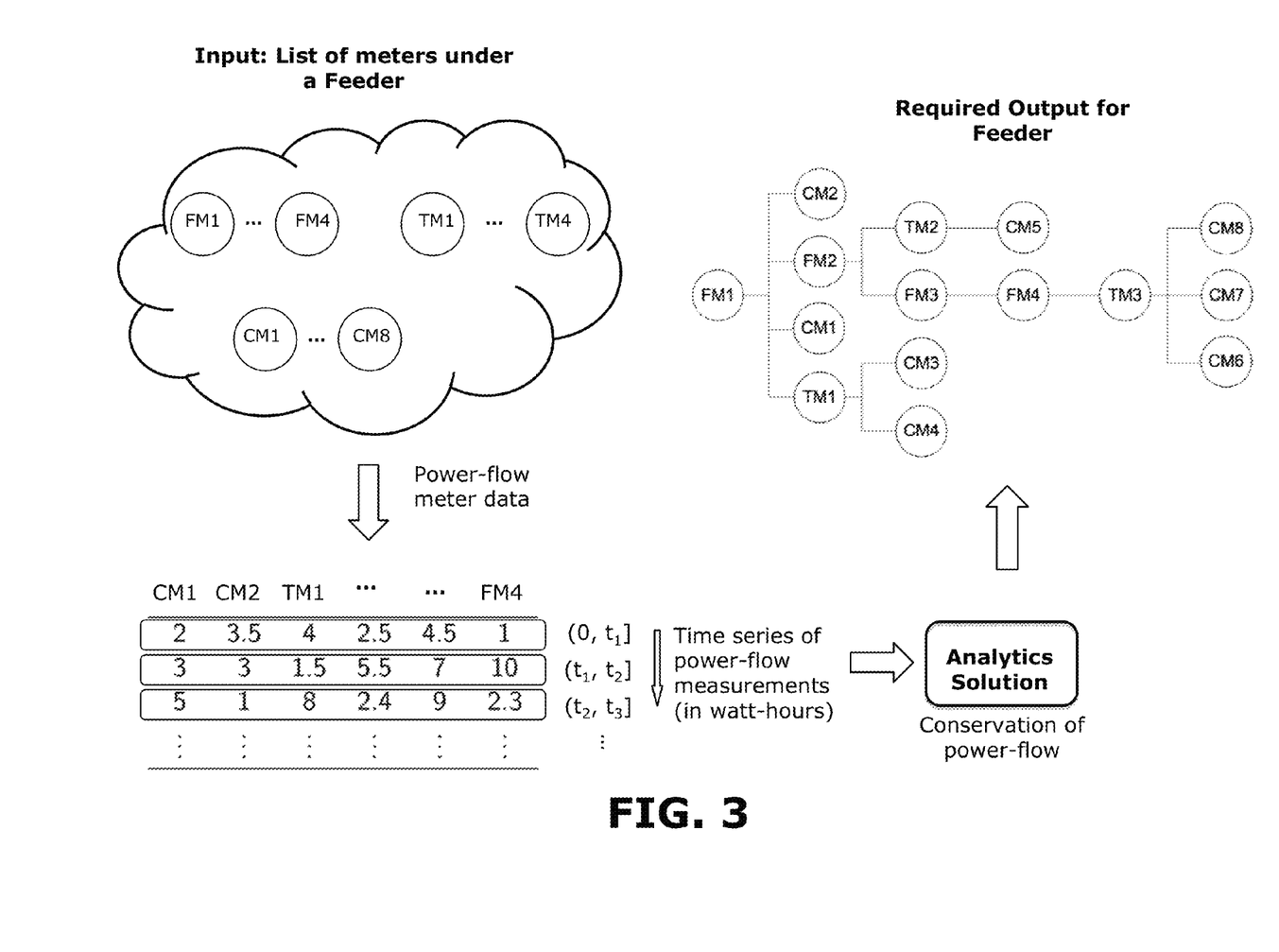
FIG. 3 schematically illustrates technical aspects of a sample problem.

FIG. 3 schematically illustrates technical aspects of a sample problem that can be addressed in accordance with at least one embodiment of the invention. As such, there can be considered the following two scenarios. In one scenario, there is known the type of each meter—CM, TM, or FM (customer/transformer/feeder meter). In this case, nodes can be partitioned into: (i) Leaves: CMs; and (ii) internal nodes: TMs & FMs. For leaf connectivity, a CM's parent could either be a TM or an FM while, for internal node connectivity, a TM's parent could only be an FM and an FM's parent could only be another FM. In the other scenario, the types of meters are not known. Here, every meter could be a leaf node or an internal node in the tree; this is a more general problem that can be addressed herein.

Figure 3A:
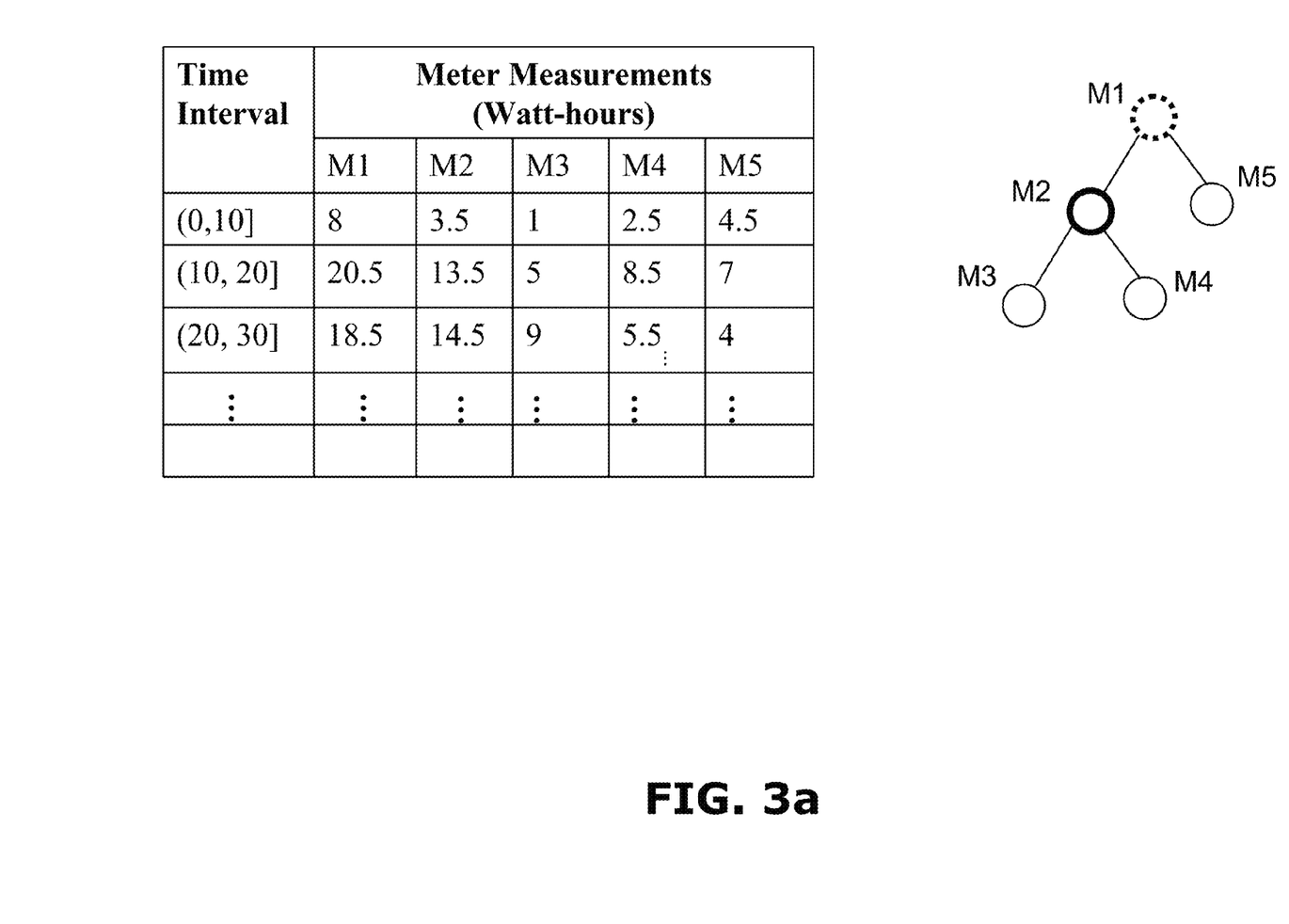
FIG. 3a presents a simple example of an approach followed in accordance with at least one embodiment of the invention.

FIG. 3a presents a simple example of an analytics approach followed in accordance with at least one embodiment of the invention. The table on the left shows a time series of power-flow measurements taken from meters M1 through M5 under a feeder. For instance, the first row shows that during the first 10 minutes M1 recorded 8 Wh of load while M5 recorded 4.5 Wh of load. The objective here is to determine the tree connectivity topology between the meters using the above measurements. It can then be observed that, at each time step, the loads measured by M3 and M4 add up to load measured by M2. Similarly M1=M3+M4+M5=M2+M5. From this, one can conclude that the tree connectivity between the meters is probably the one shown on the right. In the above example, at each time step, the load measured by a parent meter is exactly equal to the sum of loads measured by its child meters. In practice however, due to line losses, imperfect synchronization, and other errors, the load measured at a parent meter is only approximately equal to the sum of loads measured at its child meters.

With respect to the problems addressed in accordance with at least one embodiment of the invention, the underlying connectivity could be a "forest" (a collection of trees), not necessarily a single tree. For example, there may be multiple feeders under a substation. The distributor might know the set of all feeder, transformer, and customer meters under a substation. The connectivity model in this case may be a collection of trees, one corresponding to each feeder.

Generally, as considered in accordance with at least one embodiment of the invention, for any time step, a parent meter's consumption is greater than or equal to the sum of its child meters' consumption as there may be energy losses on transmission lines between the parent and its children. When there are single trees, this could be used to identify the source meter (which may have the highest consumption) and partial hierarchy information. Such heuristics could be also used to reduce the search complexity for the general problem addressed herein.

Figure 4:
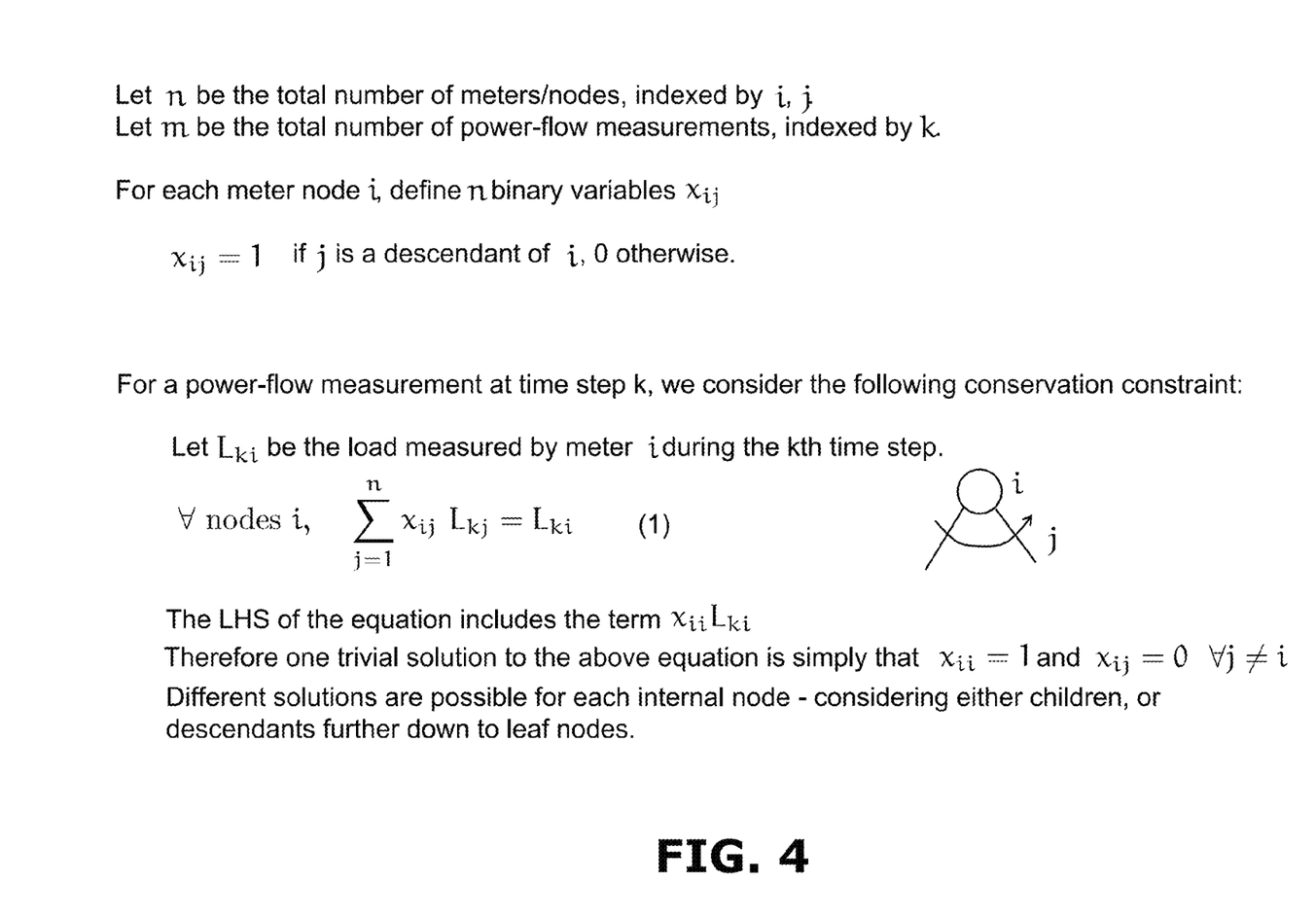
FIG. 4 summarizes a mathematical model of a no-error scenario.

FIG. 4 summarizes a mathematical model of a no-error scenario, in accordance with at least one embodiment of the invention. The no-error scenario considers the case where the energy conservation holds exactly, that is, the load measured at a node is exactly equal to the sum of loads measured by a subset of its descendant nodes. Eq. (1) provides the conservation of energy constraint for each node/meter for one time interval. The equation compares the load measured at a node/meter with the load measured at all nodes in the system during the same time interval. Eq. (1) may have multiple solutions. For example, the load at a node is equal to the sum of loads of all its child nodes. The load at a node is also equal to the sum of loads measured by all leaf nodes in the sub-tree under that node. There are other solutions, which could be combination of descendant nodes.

Figure 5:
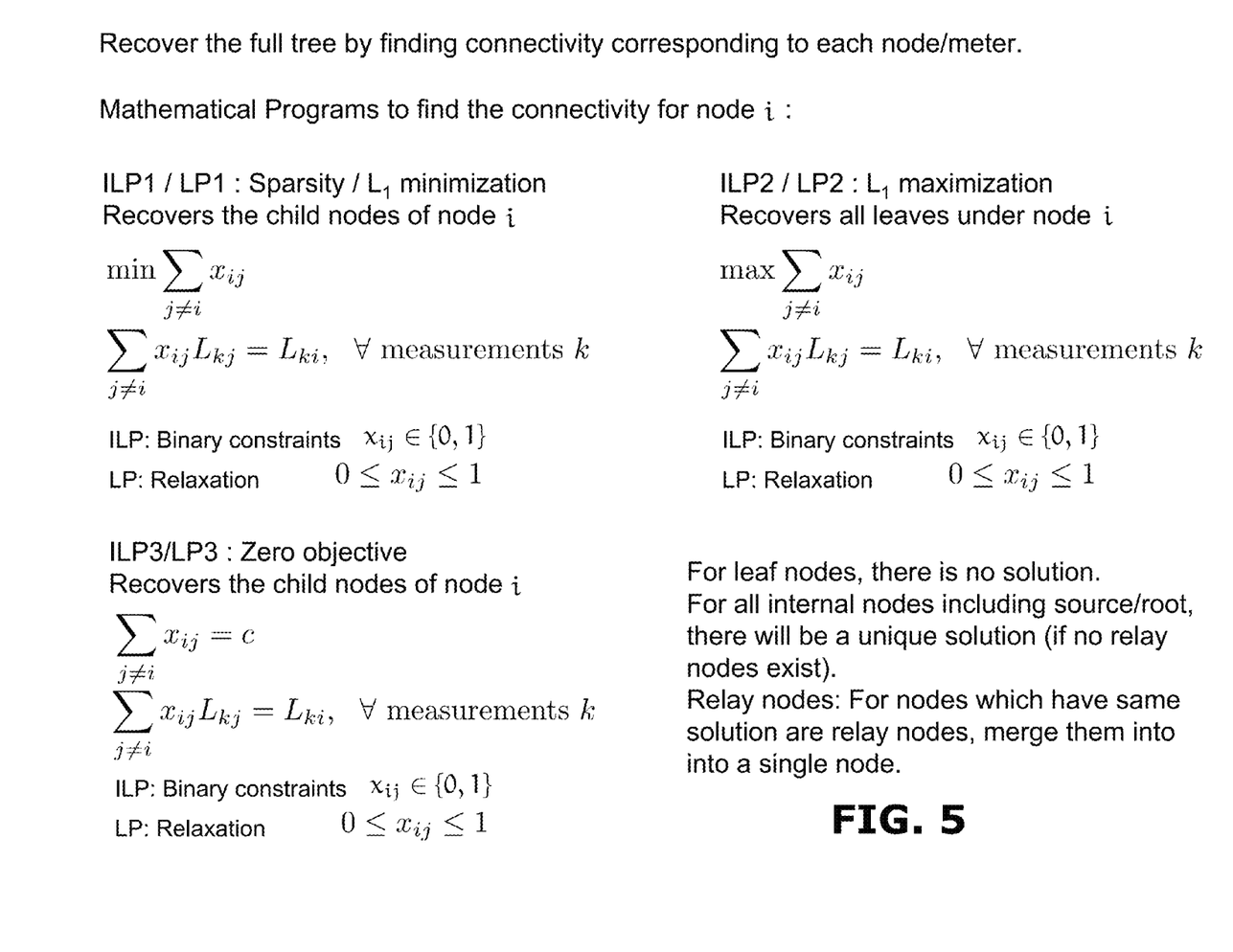
FIG. 5 summarizes mathematical programming techniques of a no-error scenario.

FIG. 5 summarizes mathematical programming techniques of a no-error scenario, in accordance with at least one embodiment of the invention. The tree connectivity model is recovered by recovering the connectivity corresponding to each node/meter. Three different mathematical programs are shown, each of which could be formulated as an ILP (integer linear program) or an LP (linear program) by imposing either integer or continuous constraints on $x_{ij}$ as shown. These mathematical programs are used to find the connectivity corresponding to each node/meter. Having found the connectivity for each node, the full tree connectivity can be recovered. ILP1 & LP1 attempt to find the sparsest solution by means of $L_1$ minimization. The sparsest solution for each internal node recovers its child nodes. ILP2 & LP2 essentially find the set of leaves in the sub-tree under each node. By knowing the set of all leaves under each node, the full tree connectivity can be obtained in a straightforward manner. ILP3 & LP3 have a zero objective function. However, they accept as input the constant c. These mathematical programs can be called successively with different values of c until a solution is found. The benefit of using LPs is that they run in polynomial time and as the number of measurements increase, they return an integer solution. If the LPs return fractional solutions, these can be rounded to obtain an approximate integer solution.

Figure 6:
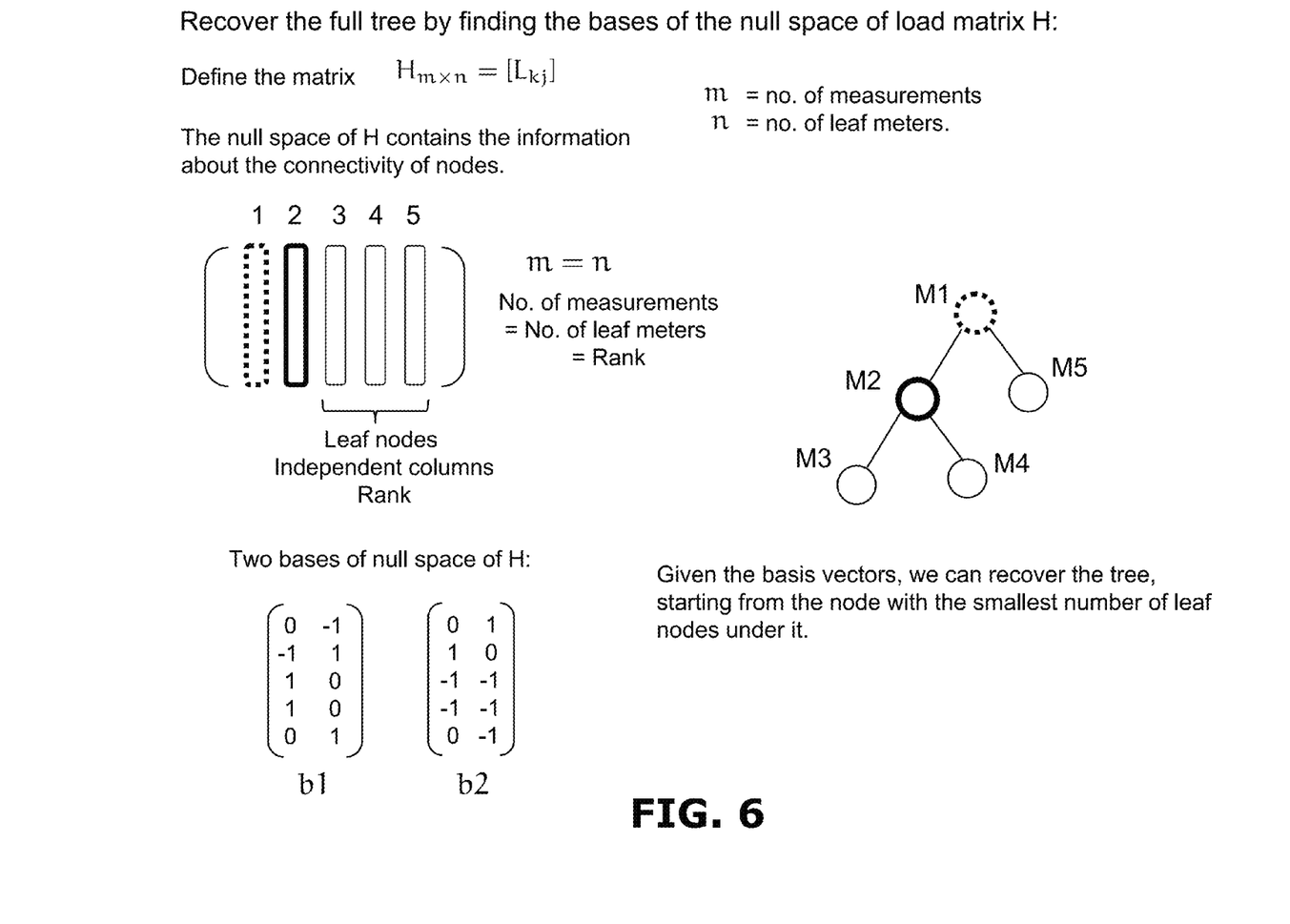
FIGS. 6 and 7 summarize null space techniques of a no-error scenario.

FIG. 6 summarizes null space techniques of a no-error scenario, in accordance with at least one embodiment of the invention. This method is used when the number of measurements is greater than or equal to the number of leaf meters/nodes. Each column of matrix H corresponds to measurements from a meter. Due to variability in energy consumption over time and over customers, the columns corresponding to leaf meters are independent. Therefore when the number of measurements=number of leaf meters, H has full rank. The bases of null space of H contain the tree connectivity information. For example, the basis b1 captures two relationships: $-M2+M3+M4=0$ and $-M1+M2+M5=0$. The basis b2 captures the relationships: $-M2+M3+M4=0$ and $M1-M2-M3=0$. Each of these bases can be used to recover the tree shown on the right. By starting with the column with least number of non-zero elements, the entire tree can be recovered step by step.

Figure 7:
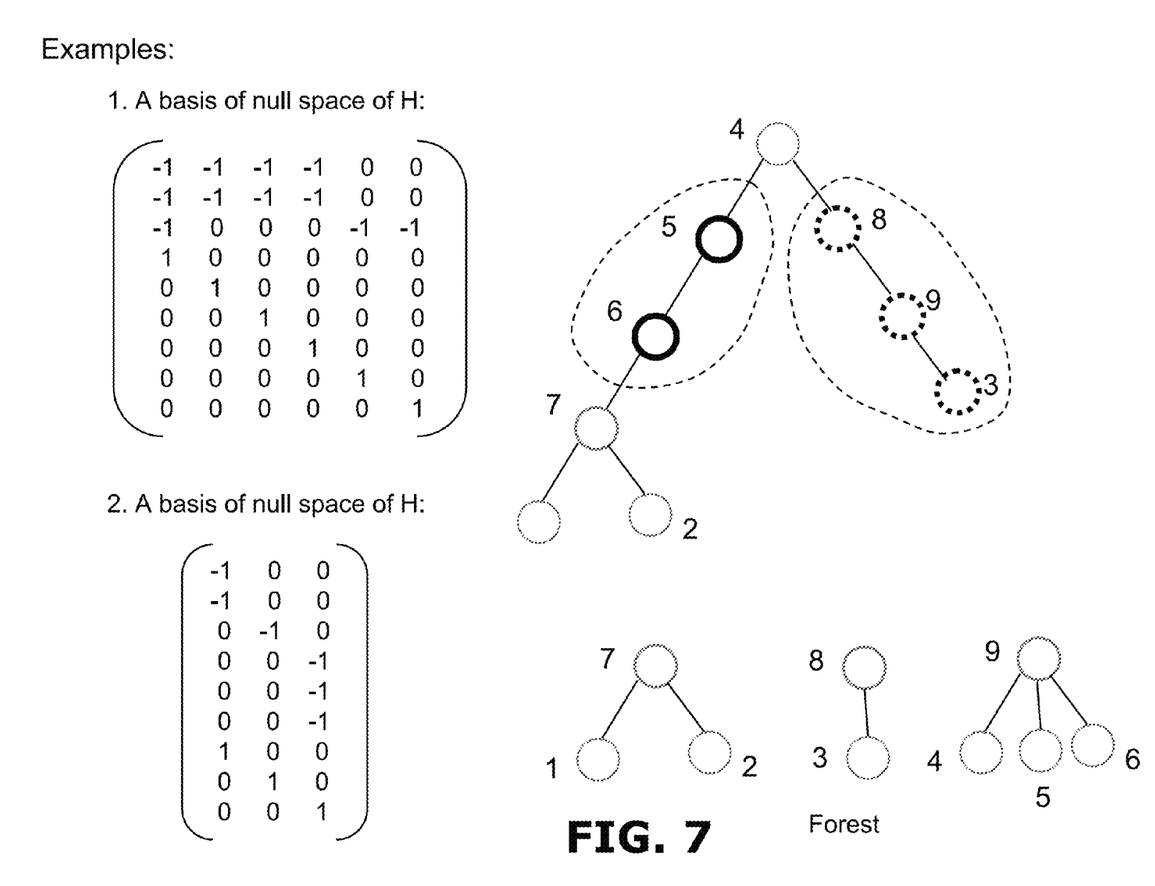

FIG. 7 summarizes some more examples of the null space methods in a no-error scenario, in accordance with at least one embodiment of the invention. When there are relay nodes, the method will merge multiple relay nodes into one node. For instance, in example 1 in FIGS. 5 and 6 will appear under 4.

Figure 8:
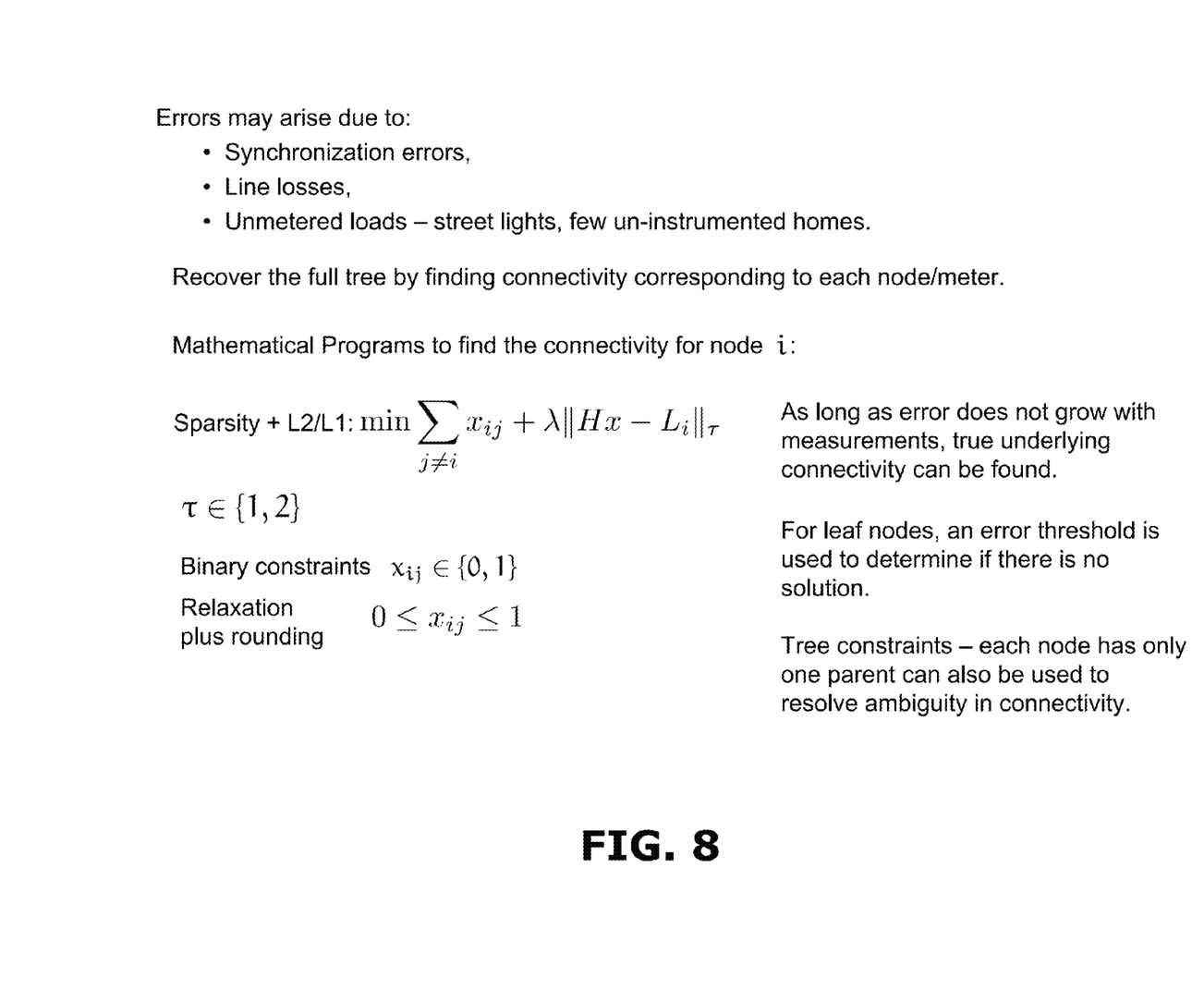
FIG. 8 summarizes a solution approach in an error scenario, where one or more solutions with less error are fit.

FIG. 8 summarizes solution approach in an error scenario, where one or more solutions with less error are fit, in accordance with at least one embodiment of the invention. The error scenario corresponds to the case where the energy conservation may not hold exactly, that is the load measured at a node is only approximately equal to the sum of loads measured by a subset of its descendant nodes. The errors may arise due to loss of synchronization between meters, energy losses on transmission lines (line losses), unmetered loads, un-instrumented customers, missing measurements, etc. As in the no-error scenario, the tree connectivity is recovered by finding the connectivity corresponding to each node/meter. The mathematical program finds the sparsest solution that minimizes the error of fit. The sparsest solution corresponds to the child nodes of a node. As in case of no-error scenario, alternative mathematical programs can also be formulated.

Figure 9:
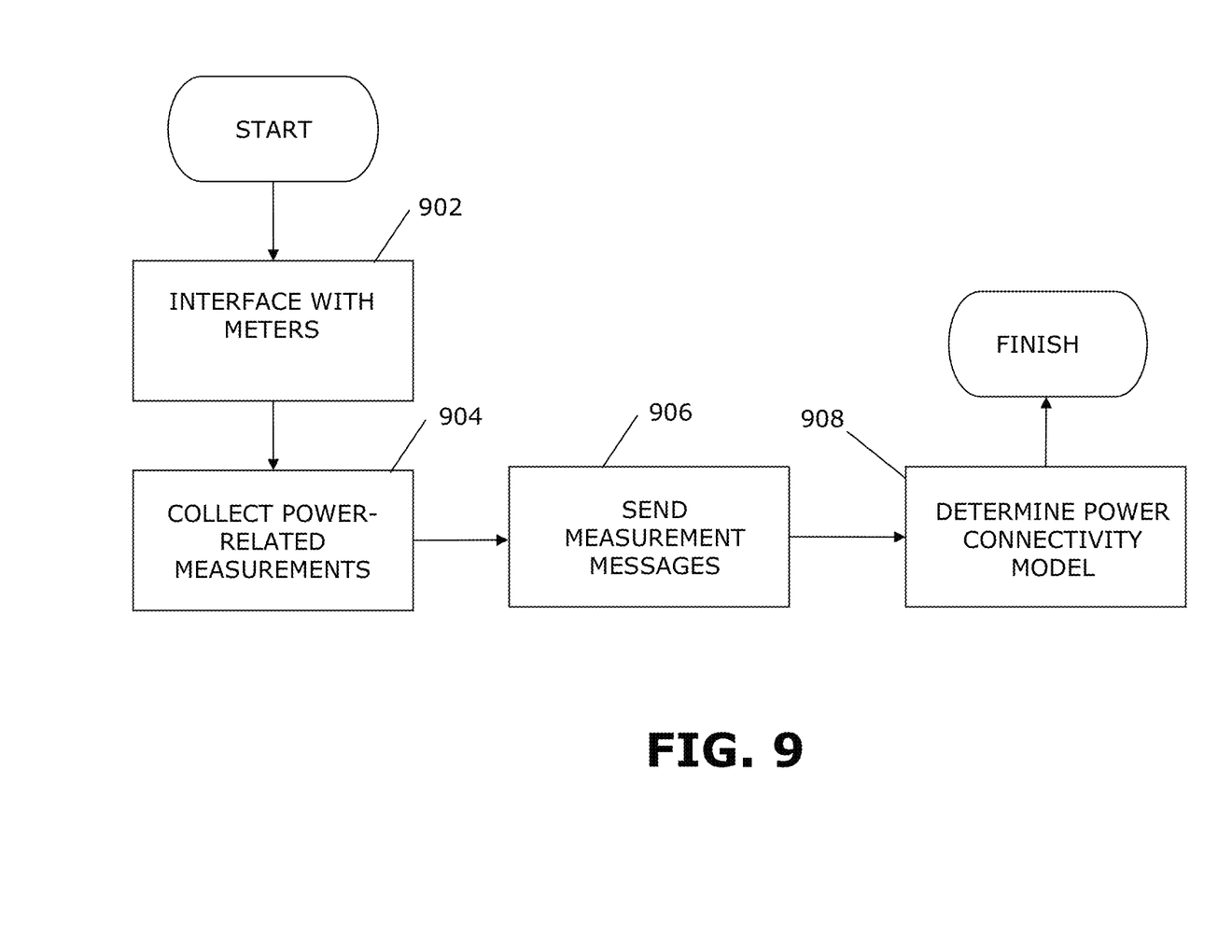
FIG. 9 sets forth a process more generally for determining a power connectivity model.

FIG. 9 sets forth a process more generally for determining a power connectivity model, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way a processing unit or units and system memory such as those indicated, respectively, at 16' and 28' in FIG. 10.

As shown in FIG. 9, in accordance with at least one embodiment of the invention, meters are interfaced with (902), and periodic synchronous power-related measurements are collected from different meters (904). Measurement messages are sent to a predetermined location for being consolidated and processed (906), and a power connectivity model is thereupon determined (908).

Figure 10:
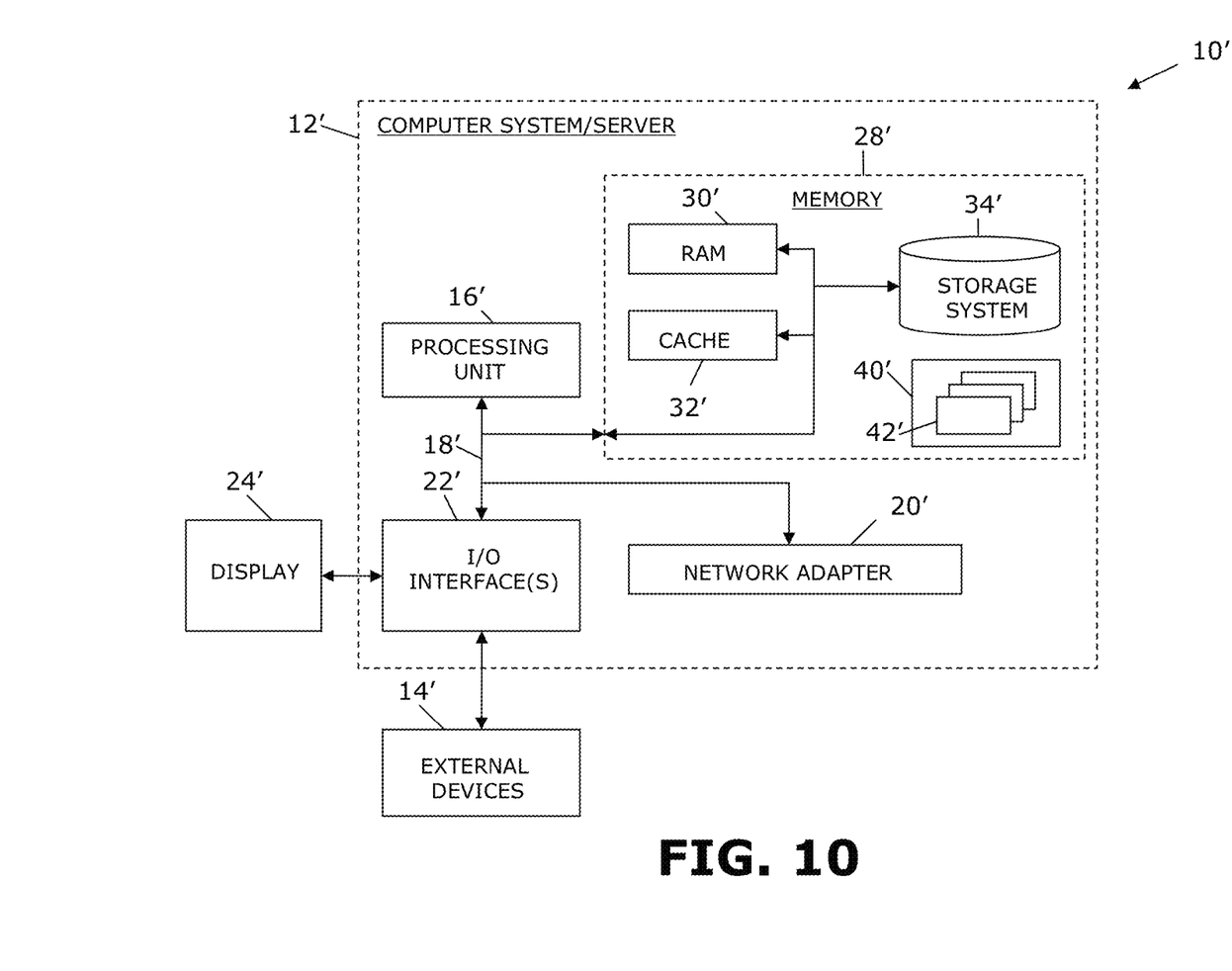
FIG. 10 illustrates a computer system.

Referring now to FIG. 10, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
interfacing with meters in an electric power grid, subsequent to repairs, maintenance or rebalancing efforts relative to the electric power grid;
obtaining power-related measurements from the meters;
said obtaining comprising receiving the power-related measurements at at least one remote device;
consolidating and processing the power-related measurements to determine an updated network connectivity model subsequent to the repairs, maintenance or rebalancing efforts;
wherein said determining comprises:
analyzing a time series of measurements, over time steps, from at least some of the meters; and
finding a sparsest set of the meters whose measurements approximately add up to the measurements of a given meter to determine connectivity among the meters; and
storing the updated network connectivity model at a data storage location.

2. The method according to claim 1, wherein said obtaining comprises collecting measurements of at least one member selected from the group consisting of: voltage; current; and elapsed kilowatt hours.

3. The method according to claim 1, wherein said obtaining comprises interfacing with at least two members selected from the group consisting of: at least one smart meter; at least one feeder meter; and at least one transformer meter.

4. The method according to claim 1, wherein said consolidating and processing comprises determining a tree connectivity model.

5. The method according to claim 1, wherein said determining comprises finding a largest set of the meters whose measurements approximately add up to the measurements of a given meter to divine an upstream-downstream connection between the given meter and the largest set of the meters.

6. The method according to claim 1, wherein said determining comprises using base vectors in a null space of a matrix of measurements from at least some of the meters to determine connectivity among the meters.

7. The method according to claim 1, wherein said collecting comprises collecting information including at least one member selected from the group consisting of: meter type; voltage; current; power factor; active power; and reactive power.

8. An apparatus comprising:
at least one processor; and
a non-transitory computer readable storage medium having computer readable program code embodied therewith and executable by the at least one processor, the computer readable program code comprising:
computer readable program code configured to interface with meters in an electric power grid, subsequent to repairs, maintenance or rebalancing efforts relative to the electric power grid;
computer readable program code configured to obtain power-related measurements from the meters;
computer readable program code configured to receive the power-related measurements at at least one remote device;
computer readable program code configured to consolidate and process the power-related measurements to determine an updated network connectivity model subsequent to the repairs, maintenance or rebalancing efforts;
wherein the determining comprises:
analyzing a time series of measurements, over time steps, from at least some of the meters; and
finding a sparsest set of the meters whose measurements approximately add up to the measurements of a given meter to determine connectivity among the meters; and
computer readable program code configured to store the updated network connectivity model at a data storage location.

9. A computer program product comprising:
a non-transitory computer readable storage medium having computer readable program code embodied therewith, the computer readable program code comprising:

computer readable program code configured to interface with meters in an electric power grid, subsequent to repairs, maintenance or rebalancing efforts relative to the electric power grid;

computer readable program code configured to obtain power-related measurements from the meters;

computer readable program code configured to receive the power-related measurements at at least one remote device;

computer readable program code configured to consolidate and process the power-related measurements to determine an updated network connectivity model subsequent to the repairs, maintenance or rebalancing efforts; wherein the determining comprises:

analyzing a time series of measurements, over time steps, from at least some of the meters; and     finding a sparsest set of the meters whose measurements approximately add up to the measurements of a given meter to determine connectivity among the meters; and computer readable program code configured to store the updated network connectivity model at a data storage location.

10. The computer program product according to claim 9, wherein said computer readable program code is configured to collect measurements of at least one member selected from the group consisting of: voltage; current; and elapsed kilowatt hours.

11. The computer program product according to claim 9, wherein said computer readable program code is configured to interface with at least two members selected from the group consisting of: at least one smart meter; at least one feeder meter; and at least one transformer meter.

12. The computer program product according to claim 9, wherein said computer readable program code is configured to determine a tree connectivity model of the meters.

13. The computer program product according to claim 9, wherein said computer readable program code is configured to find a largest set of the meters whose measurements approximately add up to the measurements of a given meter to divine an upstream-downstream connection between the given meter and the largest set of the meters.

14. The computer program product according to claim 9, wherein said computer readable program code is configured to use base vectors in a null space of a matrix of measurements from at least some of the meters to determine connectivity among the meters.

15. The computer program product according to claim 9, wherein said computer readable program code is configured to collect information including at least one member selected from the group consisting of: meter type; voltage; current; power factor; active power; and reactive power.

16. A method comprising:

utilizing at least one processor to execute computer code configured to perform the steps of:

interfacing with smart meters in a power network, and with at least one meter upstream from at least one smart meter in the power network, subsequent to repairs, maintenance or rebalancing efforts relative to the power network;

receiving measurements from the smart meters;

receiving measurements from the at least one meter upstream from at least one smart meter;

consolidating measurement data from the smart meters and the at least one upstream meter;

said consolidating comprising:

analyzing a time series of measurements, over time steps, from at least some of the meters from: the smart meters and the at least one upstream meter; and     finding a sparsest set of the meters whose measurements approximately add up to the measurements of a given meter to determine connectivity among the meters;

mapping connections between the smart meters and the at least one upstream meter based on the consolidated measurement data, to determine an updated network connectivity model subsequent to the repairs, maintenance or rebalancing efforts; and storing the updated network connectivity model at a data storage location.

\* \* \* \* \*